INVENTOR.
RUDOLF ERDMENGER
BY
Burgess, Dinklage & Sprung
ATTORNEYS

United States Patent Office 3,216,271
Patented Nov. 9, 1965

3,216,271
HOLLOW SCREWTHREAD
Rudolf Erdmenger, Bergisch-Gladbach, Germany, assignor to Farbenfabriken Bayer Aktiengesellschaft, Leverkusen, Germany, a German corporation
Filed Dec. 19, 1962, Ser. No. 245,875
Claims priority, application Germany, Jan. 4, 1962, F 35,713
4 Claims. (Cl. 74—424.8)

The invention relates to a hollow screwthread for at least two worms which rotate in the same direction and at the same angular speed about axes arranged parallel to one another and rubbing exactly against one another. A cross-sectional form of the hollow screwthread of two or more interengaging worms is known which is defined wholly or partially by arcs having a radius $(R)$=axial spacing $(A)$ of the two worms.

If worm elements with this cross-sectional form are produced as hollow elements from sheet metal for diameters greater than about 200 mm., then manufacturing difficulties such as shaping difficulties are caused by the pointed or angular form of the thread which is geometrically required.

These difficulties are now obviated by a form of screwthread which is characterized according to the invention by the fact that the cross-section at any point through the threaded element of each worm is a circle which is eccentric with respect of the worm axis and the radius of which is equal to half the spacing of two worm axes.

The two worm elements rotating in the same direction, each about one worm axis, exactly contact one another in each position, since the elements, seen in cross-section, consist at any desired position of circles which are eccentric with respect to the axis and in which $R=0.5\ A$, which circles contact each other in every position. Consequently, worms having an eccentric circular cross-section rub exactly one against the other. A screwthread which is rounded outwardly and inwardly is thus obtained. The result achieved is that the worm element made from sheet metal has no sharp edges or points, so that particularly favourable conditions are provided for the manufacture of hollow worms by shaping from sheet metal without cutting, and without foregoing the exact engagement of the worm threads one within the other. The worms can be produced from preshaped sheet metal parts, but they can also be produced from a tube by rolling or pressing.

Figure 1:
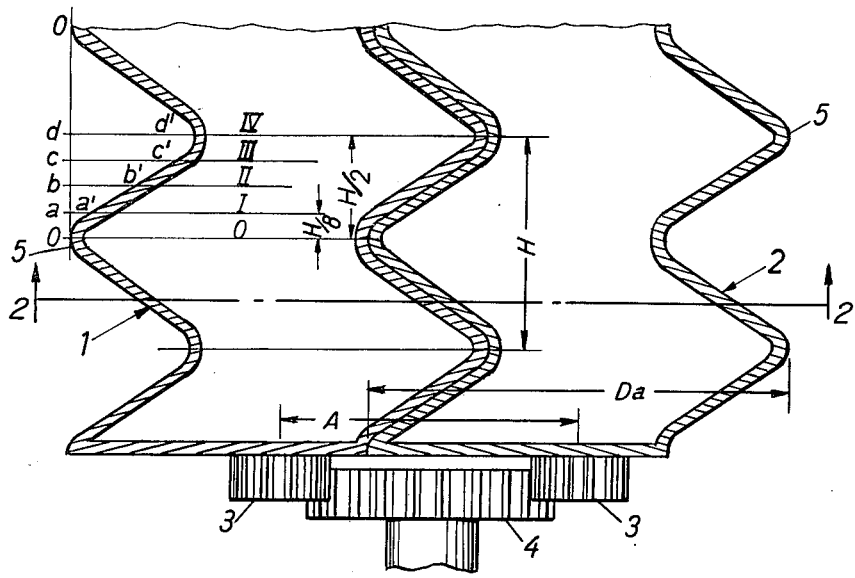
Figure 2:
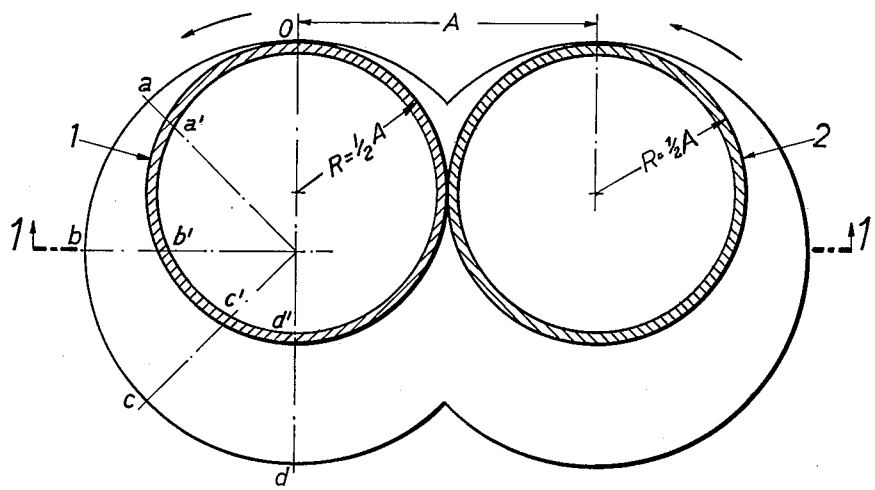

FIG. 1 shows a longitudinal section, taken along line 1—1 in FIG. 2 through two interengaging hollow worm elements 1 and 2.

FIG. 2 is a cross-section along line 2—2 in FIG. 1.

In the device of the invention, there are at least two intermeshed hollow screwthreads 1, 2 in surface contact throughout their intermeshed length. The axes of said threads are disposed parallel to each other. Means are provided for rotating the threads in the same direction and at the same angular speed about the respective axes of the screws. Thus, each screw is provided with gearing 3, and a drive gear 4 is provided for driving the gears 3 to move the screws in the same direction and at the same angular speed.

The cross-section perpendicular to the axis of each screwthread at all points along the length of the axis is a circle which is eccentric relative to the axis, and the radius of such circles is equal to half the spacing of the two axes of the screws 1 and 2. Thus, the surface contact along the intermeshed length obtains throughout rotation of the screws.

The axial spacing of the screwthreads is indicated by A, the diameter by $Da$, the pitch by H, and the radius of the circle cross-section by R.

The construction of the screwthread form shown in FIG. 1 having a pitch H is formed by plotting off with a compass the four radial lines $a$–$a'$, $b$–$b'$, $c$–$c'$ and $d$–$d'$ shown in FIG. 2 from the external diameter radially inwards along four parallel straight lines I, II, III and IV (FIG. 1) drawn parallel to one another at a spacing of ⅛ of the pitch H. The construction is all the more accurate as more straight lines I, II, III, IV etc. in FIG. 1 or sectors in FIG. 2 are chosen. From the straight line IV, the shaping movement is continued symmetrically up to the point 0.

The ratios between the diameters (external diameter: core diameter), the axial spacings and pitches can be freely chosen for the screwthread which has been described and are not related to any geometrical limits.

It is a characteristic of the screwthreads of the invention that the crests 5 are arcuate.

I claim:

1. At least two intermeshed hollow screwthreads in surface contact throughout the intermeshed length, the axes of said threads being disposed parallel to each other, means for rotating the threads in the same direction and at the same angular speed about their respective axes, each cross-section perpendicular to the axis of each screwthread at all points along the length of the axis being a circle eccentric relative to the axis, the radius of such circles being equal to half the spacing of the said axes providing said surface contact throughout rotation of the screws, and the crest of each screwthread being arcuate.

2. A hollow screwthread according to claim 1, wherein the screwthread is produced from preshaped sheet metal parts.

3. A hollow screwthread according to claim 1, characterized in that the screwthread is produced from a tube by rolling or pressing.

4. Hollow screwthread according to claim 1, said circles internally contacting the outer diameter of the screwthread.

References Cited by the Examiner
UNITED STATES PATENTS
2,321,185   6/43   Christian _____ 165—87

DON A. WAITE, *Primary Examiner.*